United States Patent
Heath, Jr. et al.

(10) Patent No.: US 10,439,845 B1
(45) Date of Patent: Oct. 8, 2019

(54) SECTORED RANDOM BEAMS FOR COMPRESSIVE CHANNEL ESTIMATION IN MASSIVE MIMO

(71) Applicant: Huawei Technologies Co., Ltd., Shenzhen (CN)

(72) Inventors: Robert Wendell Heath, Jr., Austin, TX (US); Peiying Zhu, Kanata (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/954,226

(22) Filed: Apr. 16, 2018

(51) Int. Cl.
| | |
|---|---|
| H04B 7/04 | (2017.01) |
| H04L 25/02 | (2006.01) |
| H04B 7/0408 | (2017.01) |
| H04B 7/0452 | (2017.01) |
| H04W 16/28 | (2009.01) |
| H04L 5/14 | (2006.01) |
| H04L 27/26 | (2006.01) |

(52) U.S. Cl.
CPC ....... H04L 25/0204 (2013.01); H04B 7/0408 (2013.01); H04B 7/0452 (2013.01); H04L 25/0228 (2013.01); H04W 16/28 (2013.01); *H04L 5/14* (2013.01); *H04L 25/0242* (2013.01); *H04L 27/2613* (2013.01)

(58) Field of Classification Search
CPC ............. H04L 25/0204; H04L 25/0228; H04L 25/0242; H04L 27/2613; H04L 5/14; H04W 16/28; H04B 7/0452; H04B 7/0408
See application file for complete search history.

(56) References Cited

U.S. PATENT DOCUMENTS

| | | | | | |
|---|---|---|---|---|---|
| 5,852,630 | A | * | 12/1998 | Langberg | H04L 27/2647 375/219 |
| 5,966,094 | A | * | 10/1999 | Ward | H01Q 1/246 342/373 |
| 7,813,313 | B2 | * | 10/2010 | Pan | H04B 7/0626 370/267 |
| 8,867,495 | B2 | * | 10/2014 | Farajidana | H04B 7/0417 370/252 |
| 9,577,343 | B2 | * | 2/2017 | Park | H01Q 15/14 |
| 9,923,612 | B2 | * | 3/2018 | Ji | H04B 7/2621 |

(Continued)

FOREIGN PATENT DOCUMENTS

| | | |
|---|---|---|
| CN | 102783201 A | 11/2012 |
| CN | 106358216 A | 1/2017 |

OTHER PUBLICATIONS

Adhikary, A. et al., "Joint Spatial Division and Multiplexing—The Large-Scale Array Regime," IEEE Transactions on Information Theory, vol. 59, No. 10, Oct. 2013, 23 pages.

(Continued)

*Primary Examiner* — Siu M Lee
(74) *Attorney, Agent, or Firm* — Slater Matsil, LLP

(57) ABSTRACT

A method for compressive channel estimation in a massive multiple input, multiple output (MIMO) system using sectored random beams is provided. In an embodiment, a method in a massive multiple input, multiple output (MIMO) transceiver for channel estimation includes obtaining a sector. The sector includes less than a complete coverage area of the transceiver. The method also includes transmitting, by the transceiver, a plurality of random beams to a user equipment (UE) in the sector.

17 Claims, 9 Drawing Sheets

(56) References Cited

U.S. PATENT DOCUMENTS

| | | | | |
|---|---|---|---|---|
| 2008/0219194 | A1* | 9/2008 | Kim | H04B 7/0452 370/310 |
| 2011/0205969 | A1 | 8/2011 | Ahmad et al. | |
| 2014/0098689 | A1* | 4/2014 | Lee | H04B 7/0469 370/252 |
| 2015/0071190 | A1* | 3/2015 | Lau | H04B 7/0417 370/329 |
| 2016/0191132 | A1 | 6/2016 | Rajagopal et al. | |
| 2017/0288754 | A1* | 10/2017 | Tomeba | H04W 16/28 |

OTHER PUBLICATIONS

Foo, S.E. et al., "Uplink Based Downlink Beamforming in UTRA FDD," Centre for Communications Research, University of Bristol, UK, Sep. 19-20, 2002, 12 pages.

Gao, Z. et al., "Structured Compressive Sensing-Based Spatio-Temporal Joint Channels Estimation for FDD Massive MIMO," IEEE Transactions on Communications, vol. 64, No. 2, Feb. 2016, 17 pages.

Hugl, K. et al., "Spatial Reciprocity of Uplink and Downlink Radio Channels in FDD Systems," European Cooperation in the Field of Scientific and Technical Research, Nokia Research Center, Finland, May 2002, 7 pages.

Kurras, M. et al., "Full Dimension MIMO for Frequency Division Duplex under Signaling and Feedback Constraints," 2016 24th European Signal Processing Conference (EUSIPCO), 2016, 5 pages.

Huawei et al., "Beam Based Access for 5G M-Mimo", 3GPP TSG RAN WG1 Meeting #84bis, R1-162166, Apr. 11-15, 2016, 6 Pages, Busan Korea.

Interdigital Communications, "Views on Massive MIMO for New Radio", 3GPP TSG-RAN WG1 Meeting #85, R1-165063, May 23-27, 2016, 7 Pages, Nanjing, China.

Ying, D., et al., "Sub-Sector-Based Codebook Feedback for Massive MIMO with 2D Antenna Arrays", 2014 IEEE Global Communications Conference, Dec. 8-12, 2014, 6 Pages.

\* cited by examiner

SECTORED RANDOM BEAMS FOR COMPRESSIVE CHANNEL ESTIMATION IN MASSIVE MIMO

TECHNICAL FIELD

The present invention relates generally to a system and method wireless communication, and, in particular embodiments, to a system and method for channel estimation in massive multiple input, multiple output systems.

BACKGROUND

Massive multiple input, multiple output (MIMO) is proposed for use in 5G wireless networks. In contrast to base stations for conventional MIMO systems, base stations in massive MIMO systems are equipped with many more antennas (e.g., approximately 20 to 100 antennas or more in next generation systems). In massive MIMO, a larger number of users are served simultaneously using multiuser MIMO techniques. In massive MIMO, thermal noise and fast fading vanish. Massive MIMO also provides simplified multiuser processing, reduced transmit power, and high sum-rates.

Channel state information (CSI) is an important parameter in massive MIMO systems. The CSI is used on the uplink to separate users through receive beamforming and is used on the downlink to send different data to different users through transmit beamforming. One method for determining CSI is channel estimation. Currently, two methods are proposed for channel estimation in massive MIMO. One method utilizes fully random beams. The other utilizes a collection of pointy beams. Both have disadvantages. Performing channel estimation with fully random beams is not backward compatible with user equipment (UEs) that only support beam training. Performing channel estimation with a collection of point beams does not work as well as randomized beams in terms of channel estimation.

SUMMARY

In an embodiment, a method in a massive multiple input, multiple output (MIMO) transceiver for channel estimation includes obtaining a sector. The sector includes less than a complete coverage area of the transceiver. The method also includes transmitting, by the transceiver, a plurality of random beams to a user equipment (UE) in the sector.

In an embodiment, a transceiver in a massive multiple input, multiple output (MIMO) system configured for channel estimation includes a processor configured to obtain a sector. The sector includes less than a complete coverage area of the transceiver. The transceiver also includes a transmitter configured to transmit a plurality of random beams to a user equipment (UE) in the sector.

In an embodiment, a network component includes a memory storage. The memory storage includes instructions. The network component also includes one or more processors in communication with the memory. The one or more processors execute the instructions to obtain a sector, the sector comprising less than a complete coverage area of the transceiver. The one or more processor also execute the instructions to transmit a plurality of random beams to a user equipment (UE) in the sector.

In an embodiment, a method in a user equipment (UE) in a massive multiple input, multiple output (MIMO) environment for channel estimation includes receiving, by the UE, a training signal from a base station. The training signal includes a random sectored beam. The training signal also includes beam formers and a training sequence. The method also includes a preprocessing matrix and a measurement matrix, where the measurement from the training signal. The method also includes estimating a sparsified downlink channel according to the preprocessing matrix and the measurement matrix.

In an embodiment, a user equipment (UE) includes a memory storage comprising instructions and one or more processors in communication with the memory. The one or more processors execute the instructions to receive a training signal from a base station. The training signal includes a random sectored beam. The training signal also includes beam formers and a training sequence. The one or more processors also execute the instructions to obtain a preprocessing matrix and a measurement matrix. The measurement matrix is derived from the training signal. The one or more processors also execute the instructions to estimate a sparsified downlink channel according to the preprocessing matrix and the measurement matrix.

In one or more of the preceding aspects, the random beams are generated by spatial filtering of a random beam pattern.

In one or more of the preceding aspects, the random beams are generated according to spatial filter coefficients.

In one or more of the preceding aspects, a first one of the random beams is used on a first pilot subcarrier and a second one of the random beams is used on a second pilot subcarrier, wherein the first pilot subcarrier is different from the second pilot subcarrier.

In one or more of the preceding aspects, the random beams are aggregated together in one orthogonal frequency-division multiplexing (OFDM) symbol.

In one or more of the preceding aspects, the random beams occupy only a portion of the spatial spectrum.

In one or more of the preceding aspects, the sectors are formed based on frequency division duplex (FDD) reciprocity.

In one or more of the preceding aspects, the sectors are determined according to an uplink sounding signal from the UE.

In one or more of the preceding aspects, the sectors are determined according to out-of-band information.

In one or more of the preceding aspects, the preprocessing matrix is computed from a singular-value decomposition (SVD) of $X^*[k]A_E$, where X is the training signal, $A_E$ is a dictionary, and k is a subcarrier index.

In one or more of the preceding aspects, estimating the sparsified downlink channel comprises solving $\min \|d[k]\|_1$ subject to $\|P[k]y[k] - P[k]X^*[k]A_E d[k]\|_2^2 < \epsilon_P$ where P is the preprocessing matrix, $P[k]X^*[k]A_E$ is a combined matrix, and d is the estimated sparse channel.

An advantage of a preferred embodiment of the present disclosure is that it is fully backward compatible with UEs that only support beam training while providing better channel estimation than pointy beams. One or more embodiments of the present disclosure provide higher capacity in frequency division duplex (FDD) massive MIMO systems and better quality channel estimates that channel estimation using pointy beams. One or more embodiments of the present disclosure are compatible with both compressive channel estimation and sector-level beam search. In one or more embodiments, fewer measurements are needed for compressive channel estimation versus using point beams for channel estimation. One or more embodiments of the present disclosure are compatible with out-of-band aided systems. Out-of-band information can be used as a prior to select sectors and reduce overhead.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed are methods and systems for generating and using sectored random beams for channel estimation and compressive channel estimation in massive MIMO. Each sector includes less than a complete coverage area for a base station. The sectored random beams are determined according to feedback from a user equipment (UE). The sectored random beams are random (or pseudo random) on each subcarrier, meaning that it is not a single pointy beam and that it is different for each subcarrier. In a fully random beam, the weighting coefficients for the power and phase for each antenna in a massive MIMO system are randomly generated. Thus, the power and/or phase at each antenna are likely different from the power and/or phase of the other antennas. The fully random beam is not focused and is not clean radiating in all directions, although the strength of the beam in any direction may be different from that of a different direction. In contrast, the power and phase for each antenna in the MIMO system are the same for a pointy beam resulting in a beam that is highly directional and points in a specific direction. The disclosed sectored random beams are similar to a fully random beam except that the beam is limited to radiating into a particular sector that is a subset of the coverage area of the massive MIMO system. Fully random beams require less training and overhead for channel estimation than pointy beams. However, fully random beams are not backward compatible with UEs that only support beam training. However, unlike systems with fully random beams, the disclosed systems and methods are backward compatible with UEs that only support beam training. Furthermore, the performance of the disclosed methods and systems is better than that of pointy beams which do not work as well as randomized beams in terms of channel estimation. Additionally, the disclosed methods and systems are compatible with both compressive channel estimation and sector-level beam search. In one or more embodiments, fewer measurements are needed for compressive channel estimation versus using point beams for channel estimation. Additionally, the disclosed methods and systems are compatible with out-of-band aided systems. Out-of-band information can be used as a priori to select sectors and reduce overhead. For example, the base station can use an uplink (UL) sounding signal from a UE to determine the location from which the UE transmitted the sounding signal. The base station can then use the determined location of the UE to form a sector for the sectored random beams.

Figure 1:
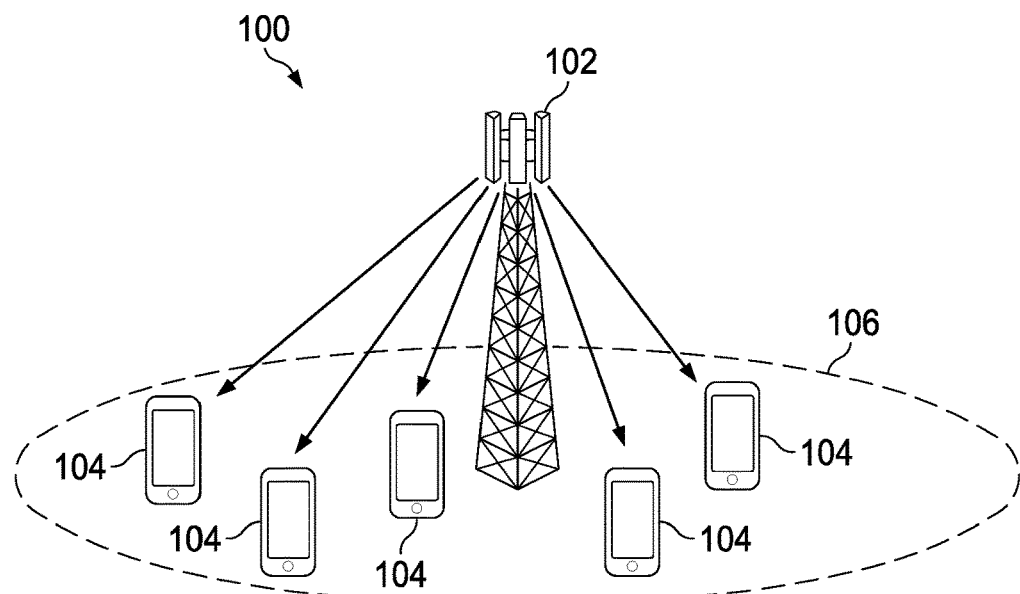
FIG. 1 is a diagram illustrating an embodiment of a communication system.

FIG. 1 is a diagram illustrating an embodiment of a communication system 100. Communication system 100 includes a base station 102 having a coverage area 106 and a plurality of user equipment (UEs) 104. The base station 102 is a massive MIMO system. The base station 102 may comprise any component capable of providing wireless access with the UEs 104. The base station 102 may be a base station transceiver (BST), an enhanced node B (eNB), a next generation node B (gNB), a femtocell, and other wirelessly enabled transceiver devices. The UEs 104 may comprise any component capable of establishing a wireless connection with the base station 102. Examples of UEs 104 include mobile phones, smart phones, laptop computers, and tablet computers. The base station 102 is connected to a backhaul network (not shown) that allows the UEs to communicate with other devices in a network. In some embodiments, the system 100 may include various other wireless device such as relays, femtocells, etc. The UE2 104 performs uplink (UL) channel sounding. The base station 102 forms a sector for sectored random beam based training based on FDD reciprocity. The sector formed by the base station 102 covers a UE 104 location. The sector formed by the base station 102 covers less than the total coverage area 106 of the base station 102.

Figure 2:
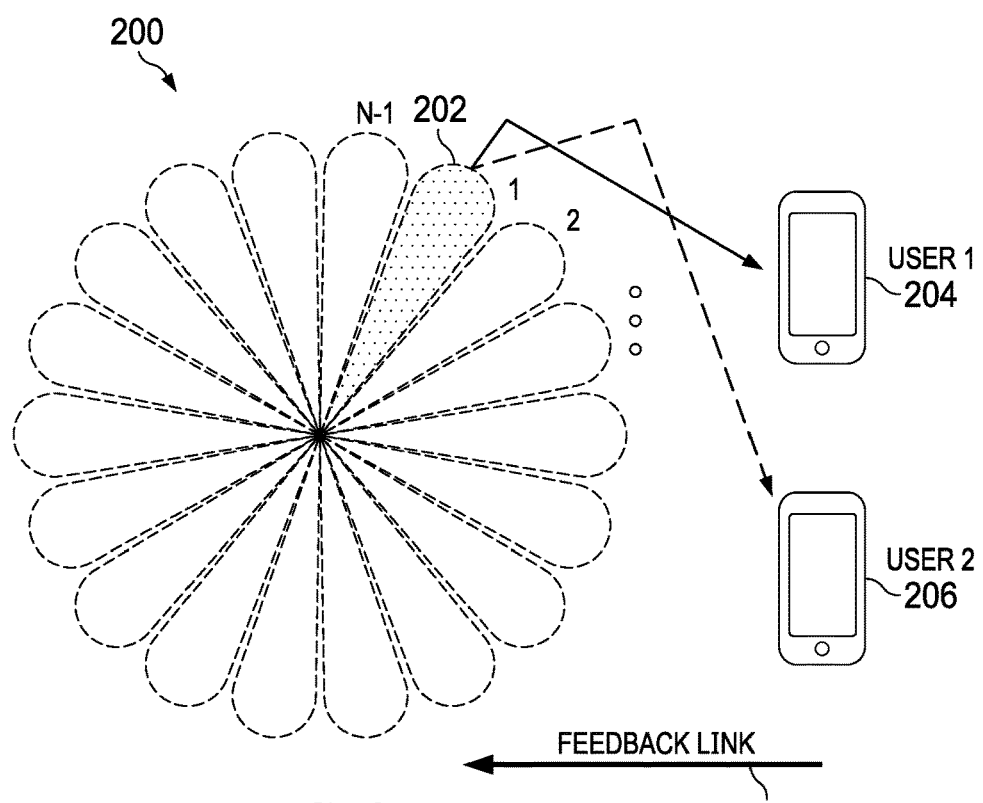
FIG. 2 is a diagram of a system for beam based training and compressive channel estimation in a massive MIMO cellular system.

FIG. 2 is a diagram of a system 200 for beam based training and compressive channel estimation in a massive MIMO cellular system. The system 200 may be implemented as system 100 depicted in FIG. 1. The system 200 includes a massive MIMO base station (not shown) and a plurality of UEs 204, 206. Different beams 202 (labeled 1, 2, . . . , N–1) are trained in turn. The base station sends training signals to the UEs 204, 206 on different spatial beams. The UEs 204, 206 measure the signal power or signal-to-interference-plus-noise ratio (SINR) on each beam. The UEs 204, 206 report their preferred beams to the base station. The base station uses knowledge of preferred beams to send data to the UEs 204, 206.

Figure 3:
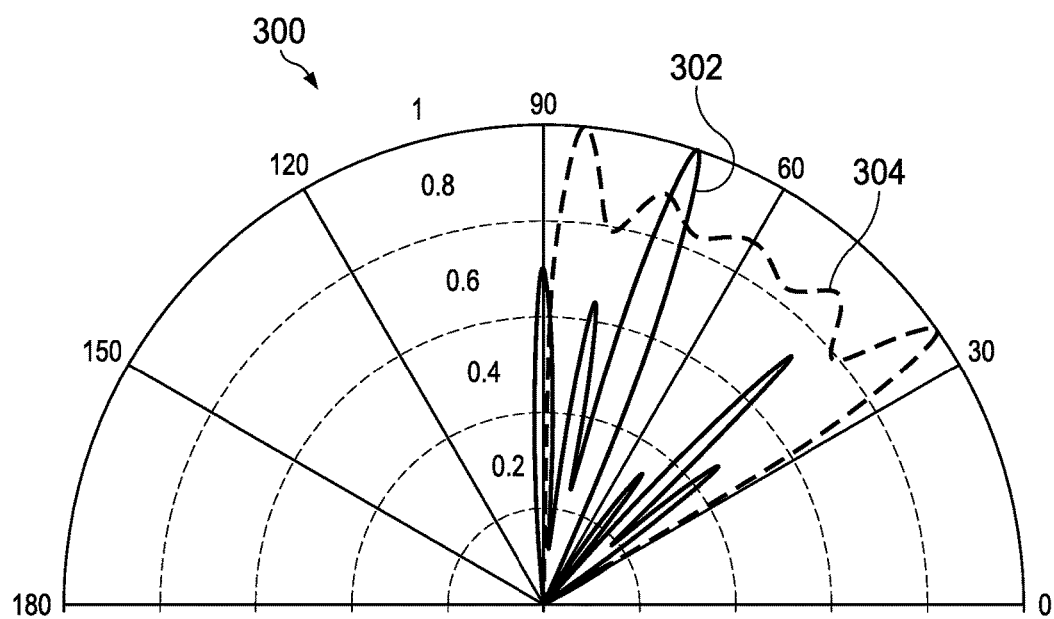
FIG. 3 is a graph showing an embodiment of a plurality of random sectored beams.

In an aspect, the sector covers an angular range of 60 degrees as shown in FIG. 3. The graph 300 shown in FIG. 3 shows a plurality of random beams 302 of various signal strengths. The graph 300 also shows the aggregate 304 of the random beams 302. The aggregate 304 of the random beams 302 has varied signal strength over the angular range of 30 degrees to 90 degrees. There is no beam in any other direction from the base station during this time period. Thus, in the depicted example in FIG. 3, beams are only transmitted in the sector defined as between 30 degrees and 90 degrees of the total coverage area of the base station during a first training period. The sector shown in FIG. 3 is only an example of a sector. In other aspects, the sector could include a larger or smaller angular area than shown in FIG. 3. However, the sector will cover an area less than a total coverage area of the base station.

Figure 4:
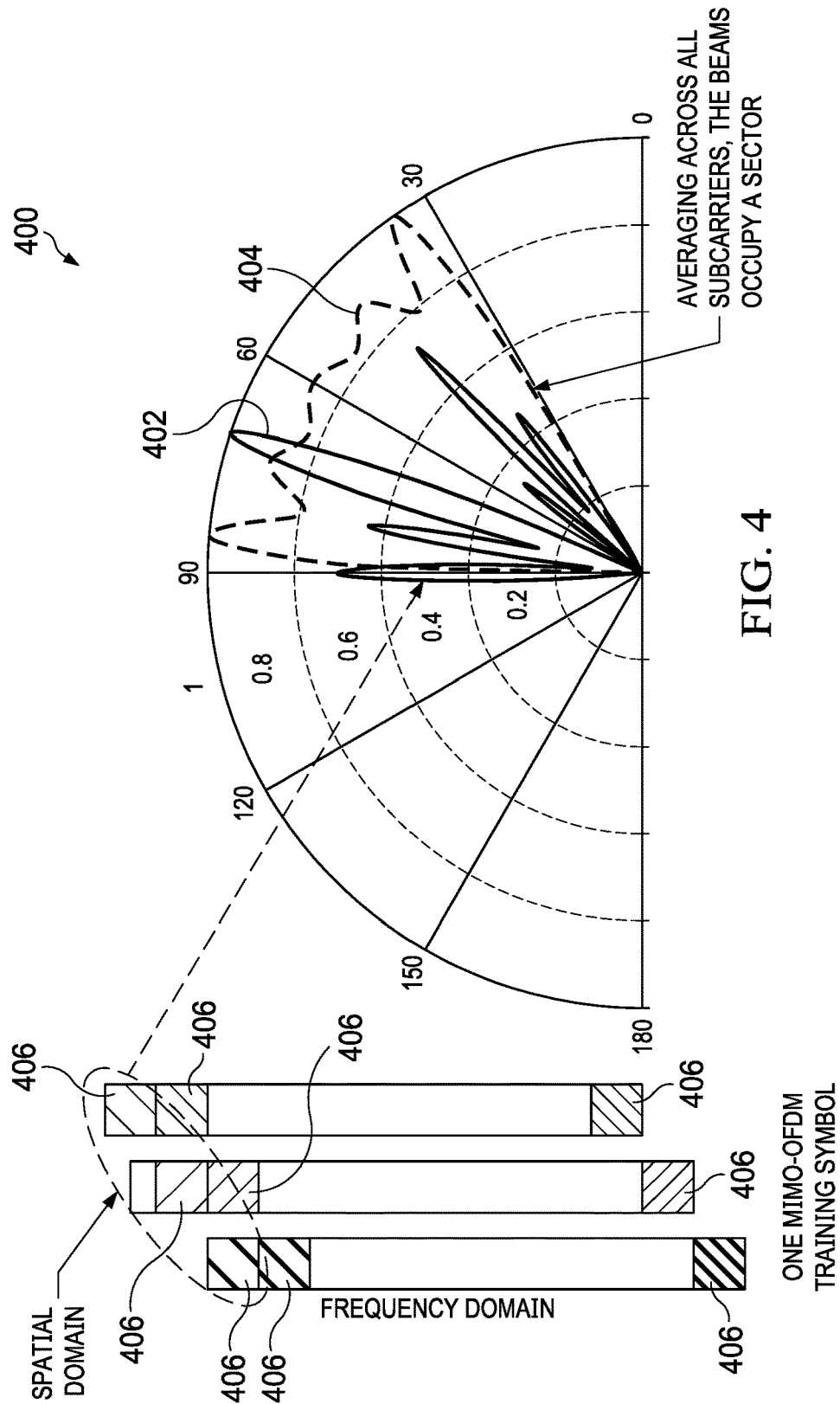
FIG. 4 is a diagram illustrating an embodiment of a relation between the frequency domain, the spatial domain, and the sectored random beams.

FIG. 4 is a diagram 400 illustrating an embodiment of a relation between the frequency domain, the spatial domain, and the sectored random beams. Each block 406 is a subcarrier. The random beams 402 represent one set of subcarriers 406 from each spatial domain for a particular part of the frequency domain. The beams are random (or pseudo random) on each subcarrier, meaning that it is not a single pointy beam and that it is different for each subcarrier. As used herein, the terms random and pseudo random are used interchangeably. The aggregate beam 404 is an averaging all subcarriers of the individual random beams 402 across all spatial domains and all frequency domains. The beams 402 occupy a sector. In the spatial domain, the beams comprise one MIMO—orthogonal frequency-division multiplexing (OFDM) training symbol.

Figure 5:
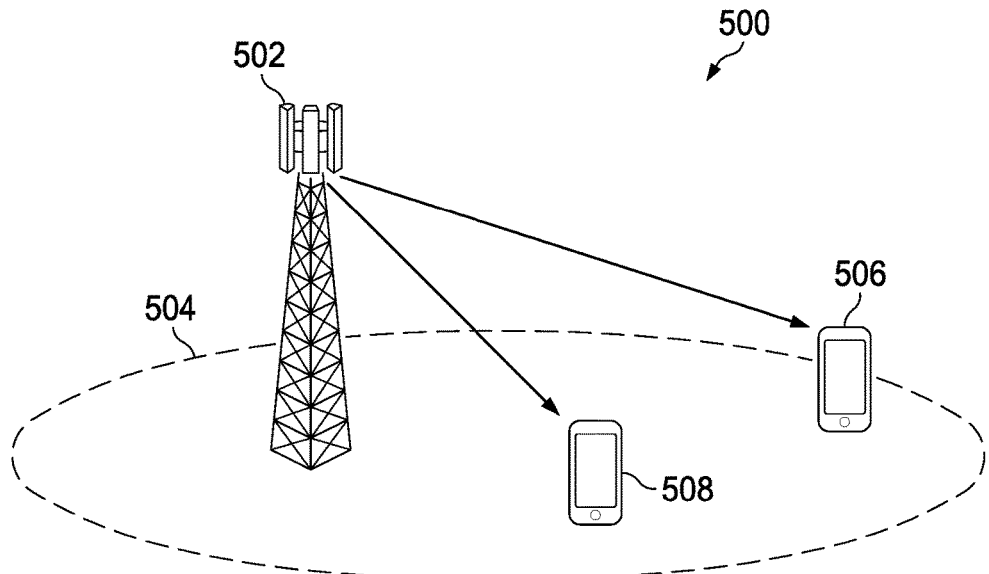
FIG. 5 is a diagram illustrating an embodiment of a communication system.

FIG. 5 is a diagram illustrating an embodiment of a communication system 500. The system 500 includes a massive MIMO base station 502 having a coverage area 504. The system 500 also includes UEs 506, 508. The base station 502 supports sectored random beams. In an aspect, the base station 502 may switch between using sectored random beams and conventional training. The base station 502 broadcasts a channel to indicate support for sectored random beams. Each UE 506, 508 provides feedback to the base station 502 indicating whether it supports sectored random beams. If the UE 506 and/or UE 508 supports sectored random beams, the base station 502 transmits sectored random beams to the UE 506 and/or 508. The base station 502 generates sectored random beams by spatial filtering of a random beam pattern. Spatial filtering the random beam pattern effectively reduces the weight of particular ones of the random beams that do not point into the identified sector to zero such that only beams that contribute to the beam pattern in the sector have a non-zero weighting coefficient. The spatial filter coefficients are provided by the sector beam pattern. In an aspect, the base station 502 may support sector selection based on out-of-band information. For example, the out-of-band information may be an uplink (UL) sounding signal received from the UE. The base station can use this UL sounding signal from the UE to determine the location from which the UE transmitted the sounding signal. The base station can then use the determined location of the UE to form a sector for the sectored random beams.

Figure 6:
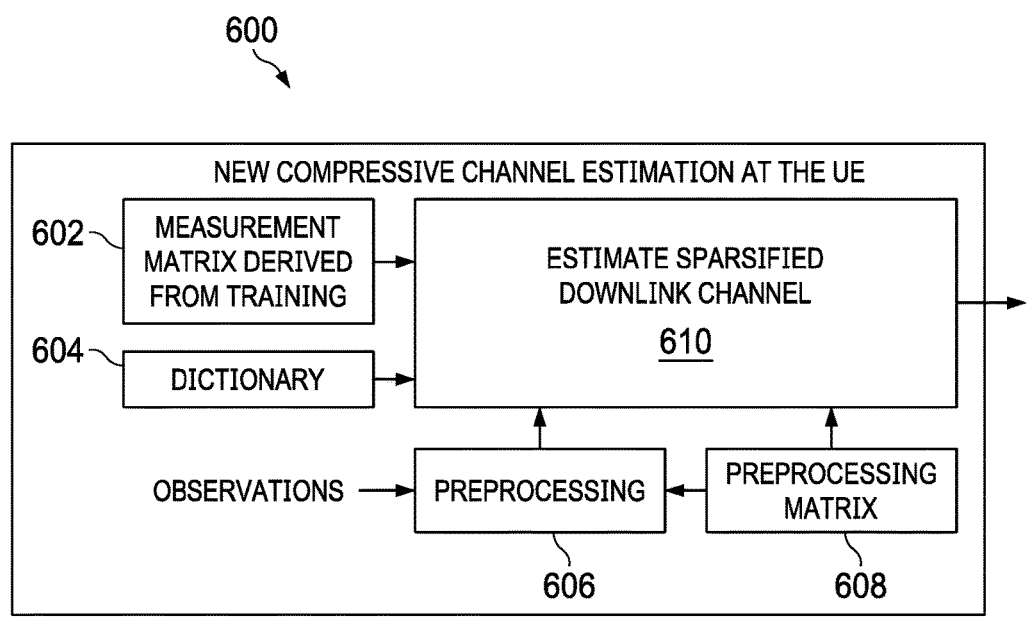
FIG. 6 is a block diagram of an embodiment of a method in a UE for compressive channel estimation using sectored random beams.

FIG. 6 is a block diagram of an embodiment of a method 600 in a UE for compressive channel estimation using sectored random beams. At block 610, the UE estimates a sparsified downlink channel based on a measurement matrix derived from training 602, a dictionary 604, preprocessing 606, and a preprocessing matrix 608. The training 602 is performed using random sectored beams. The processing 606 is performed according to UE observations and the preprocessing matrix 608. The preprocessing matrix 608 may be computed at the UE, may be already know by the UE from storage, or may be broadcast from the base station. In an aspect, the preprocessing matrix 608 is computed from the singular-value decomposition (SVD) of $X^*[k]A_E$. A combined matrix may be computed at the UE, may be already known by the UE from storage, or may be broadcast from the base station. Preprocessing 606 changes the sparse problem solved to $\min\|d[k]\|_1$ subject to $\|P[k]y[k]-P[k]X^*[k]A_Ed[k]\|_2^2 < \in_P$. The term, is obtained from processing of measurements. The term $P[k]X^*[k]A_E$ is the combined matrix and must be known or computed, where P is the preprocessing matrix, X is the transmitted training signal (including beam-formers and training sequences), $A_E$ is the dictionary used in channel estimation, y is the received training signal (i.e. measurements), k is subcarrier index, and d is the to be estimated sparse channel.

Figure 7:
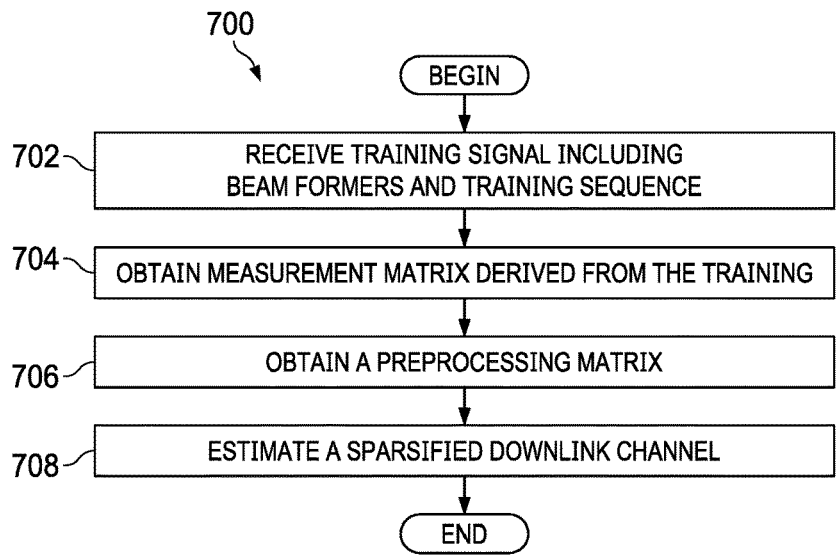
FIG. 7 is a flowchart of an embodiment of a method in a UE for compressive channel estimation using sectored random beams.

FIG. 7 is a flowchart of an embodiment of a method 700 in a UE for compressive channel estimation using sectored random beams. The method 700 begins at block 702 where the UE receives a training signal from the base station. The training signal includes a sectored random beams as described herein. The training signal includes beam formers and a training sequence. At block 704, the UE obtains a measurement matrix that is derived from the training signal. At block 706, the UE obtains a preprocessing matrix. The preprocessing matrix may be computed at the UE, may be already know by the UE from storage, or may be broadcast from the base station. In an aspect, the preprocessing matrix is computed from the singular-value decomposition (SVD) of $X^*[k]A_E$. A combined matrix may be computed at the UE, may be already known by the UE from storage, or may be broadcast from the base station. Preprocessing changes the sparse problem solved to $\min\|d[k]\|_1$ subject to $\|P[k]y[k]-P[k]X^*[k]A_E d[k]\|_2^2 < \in_P$. The term, is obtained from processing of measurements. The term $P[k]X^*[k]A_E$ is the combined matrix and must be known or computed, where P is the preprocessing matrix, X is the transmitted training signal (including beam-formers and training sequences), $A_E$ is the dictionary used in channel estimation, y is the received training signal (i.e. measurements), k is subcarrier index, and d is the to be estimated sparse channel. At block 708, the UE estimates a sparsified downlink channel according to the preprocessing matrix, the measurement matrix, and observations (i.e., measurements). The received training signal is an example of an observation or measurement. Given the received training signal, the preprocessing matrix, and the measurement matrix, the UE can estimate the channel using compressive sensing.

Figure 8:
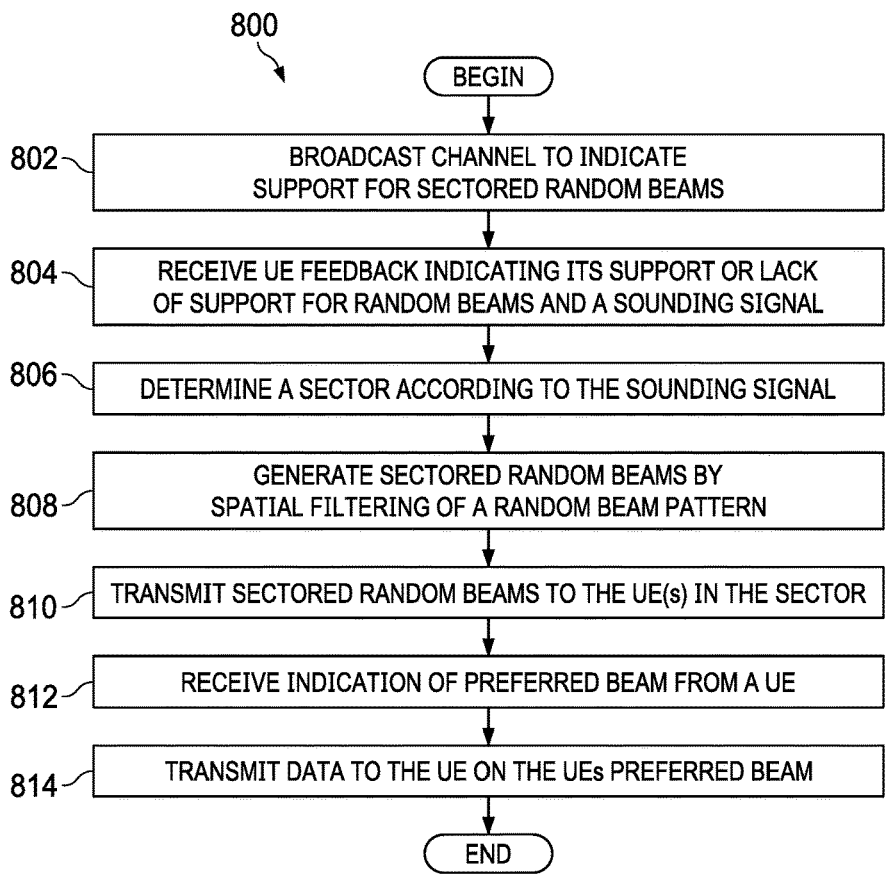
FIG. 8 is a flowchart of an embodiment of a method in a BS for compressive channel estimation in massive MIMO using sectored random beams.

FIG. 8 is a flowchart of an embodiment of a method 800 in a BS for compressive channel estimation in massive MIMO using sectored random beams. The method begins at block 802 where the base station broadcasts a channel to one or more UEs to indicate support for sectored random beams. At block 804, the base station receives UE feedback indicating its support or lack of support for sectored random beams and also receives a sounding signal from the UE. At block 806, the base station determines a sector according to a sounding signal received from the UE. In an aspect, receiving the sounding signal includes the UE performing uplink (UL) channel sounding. The base station forms a sector for sectored random beam based training based on FDD reciprocity. The sector formed by the base station covers the UE location. The sector formed by the base station covers less than the total coverage area of the base station. In an aspect, a sector is at least wide enough so that a UE can observe beams reflected from different directions (i.e., spatial angles). At block 808, the base station generates sectored random beams by spatial filtering of a random beam pattern. In an aspect, spatial filtering forces the coefficients or weights of beams that are outside of the sector to be zero such that only beams within the sector contribute to the sectored random beam pattern. At block 810, the base station transmits sectored random beams to the UE(s) in the sector. At block 814, the base station receives an indication of a preferred beam from a UE in the sector. At block 816, the base station transmits data to the UE on the UE's preferred beam, after which, the method 800 ends.

Figure 9:
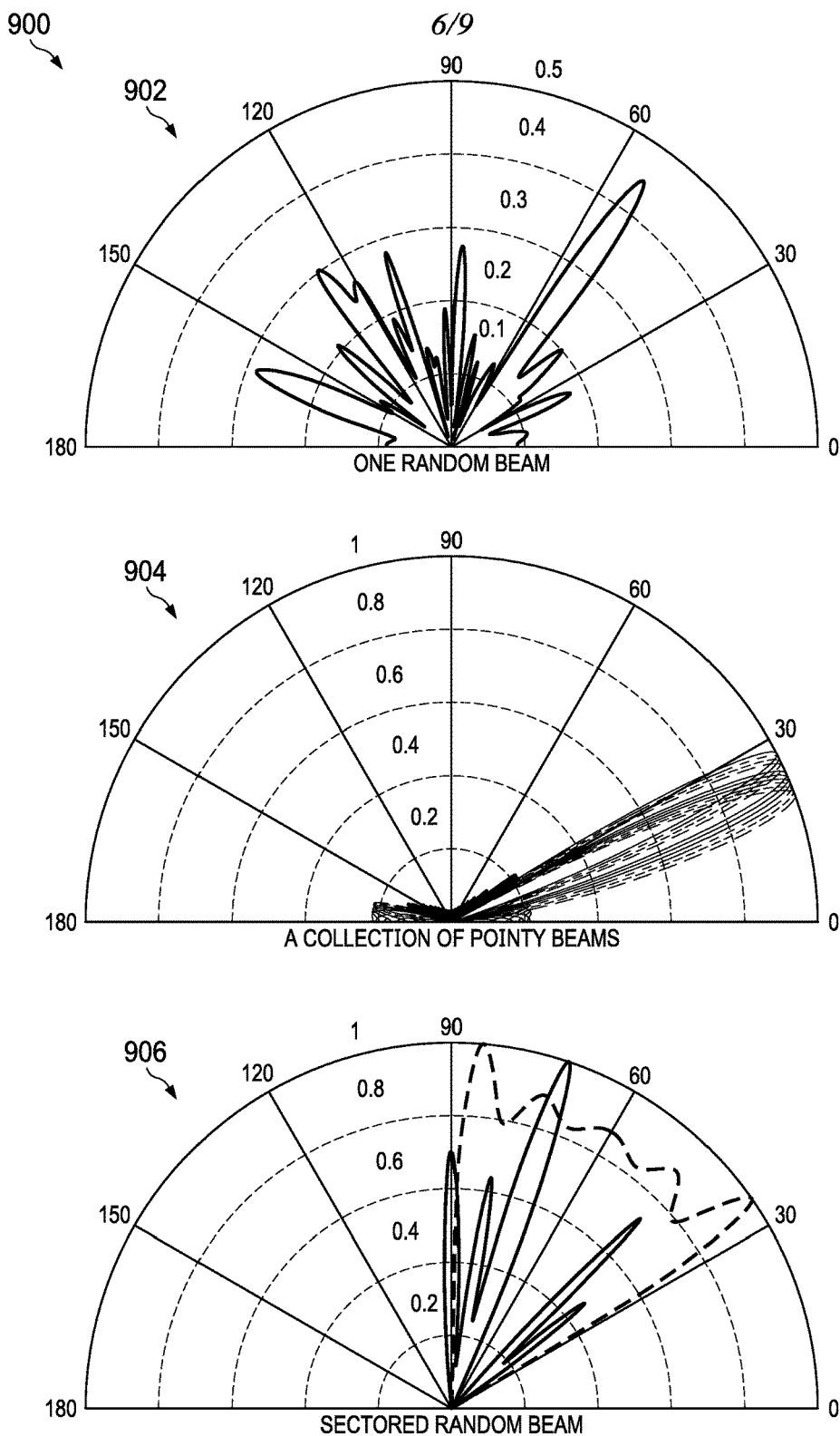
FIG. 9 is a diagram comparing a random beam pattern, a collection of point beams, and a random sectored beam made up of a collection of random beams that are limited to a particular sector of the total coverage area of a base station.

FIG. 9 is a diagram 900 comparing a random beam pattern 902, a collection of point beams 904, and a random sectored beam 906 made up of a collection of random beams that are limited to a particular sector of the total coverage area of a base station. The disclosed approach using a random sectored beam 906 is less random than fully random beams that might be used in a typical compressed sensing algorithm. However, fully random beams are not backward compatible with UEs that only support beam training whereas the disclosed systems and methods are backward compatible with UEs that only support beam training. This is true because a sector can be made very narrow, if necessary, such that it becomes beam training. The disclosed systems and methods are more random than a collection of pointy beams 904. The sectored random beams 906 are random (or pseudo random) on each subcarrier, meaning that it is not a single pointy beam and that it is different for each subcarrier. The power and phase for each antenna in a MIMO system using pointy beams are the same for each antenna thereby resulting in a beam that is highly directional and points in a specific direction. However, pointy beams do not work as well as randomized beams in terms of channel estimation. When compressive sensing is used at the receiver for channel estimation, randomized beams work better. Pointy beams do not use compressive sensing because the beams only come from one direction (and that's why it is called "pointy"). In a fully random beam 904, the weighting coefficients for the power and phase for each antenna in a massive MIMO system are randomly generated. Thus, the power and/or phase at each antenna are likely different from the power and/or phase of the other antennas. However, the fully random beam 902 is not focused radiating in all directions, although the strength of the beam in any direction may be different from that of a different direction. The disclosed sectored random beams are similar to a fully random beam except that the beam is limited to radiating into a particular sector that is a subset of the coverage area of the massive MIMO system. Fully random beams require less training and overhead for channel estimation than pointy beams. However, fully random beams are not backward compatible with UEs that only support beam training. Thus, the disclosed methods and systems provide better channel estimation than a collection of pointy beams while also being backward compatible with UEs that only support beam training.

Figure 10:
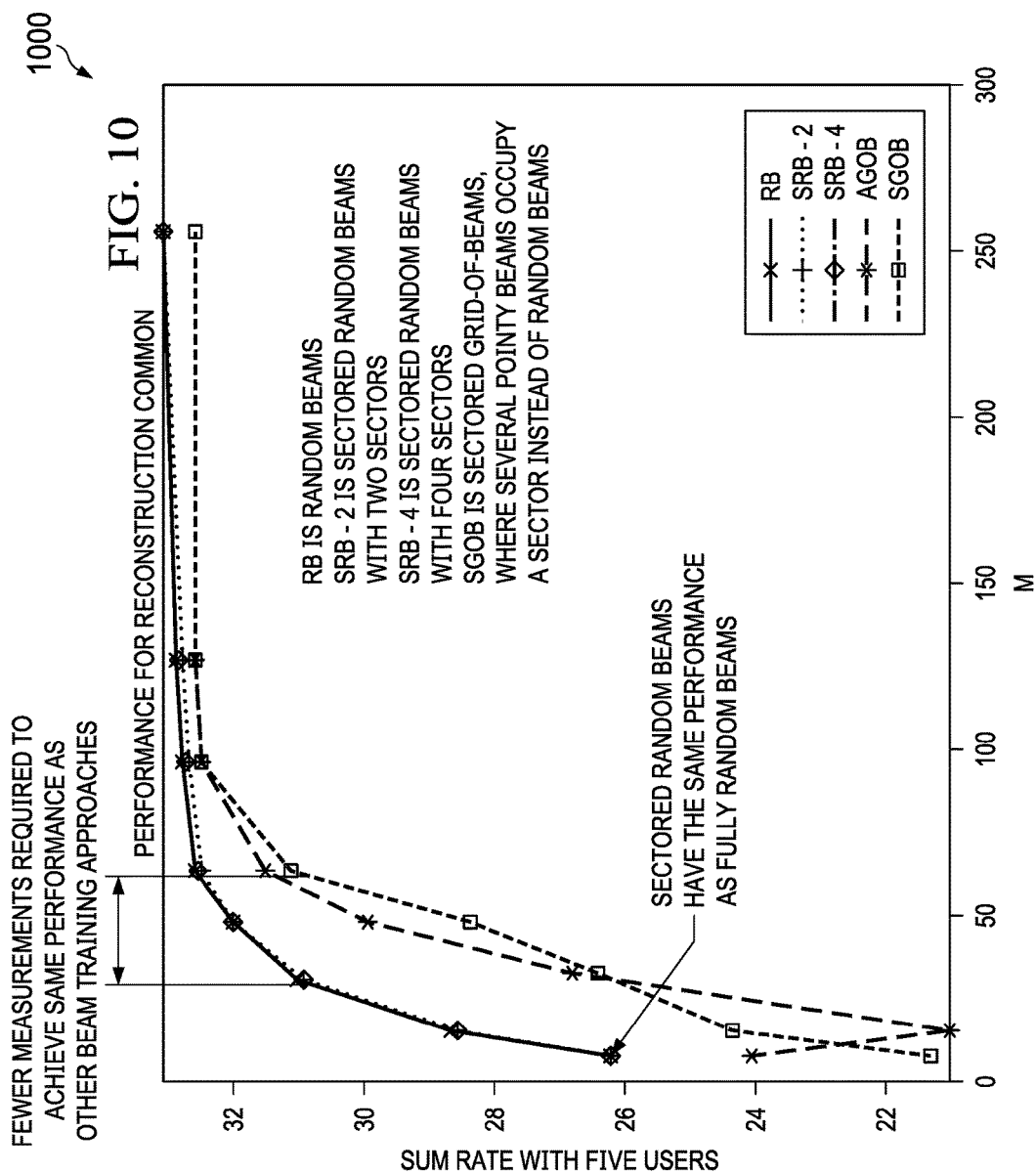
FIG. 10 is a graph channel estimation performance in terms of number of measurements versus the sum rate with 5 users for several different embodiments of the disclosed methods and system as well as for random beams and a sectored grid-of-beams.

FIG. 10 is a graph 1000 channel estimation performance in terms of number of measurements versus the sum rate with 5 users for several different embodiments of the disclosed methods and system as well as for random beams and a sectored grid-of-beams. The graph 1000 compares the performance of random beams, sectored random beams with two sectors, sectored random beams with four sectors, an Analog Grid-of-Beams (AGOB), and a sectored grid-of-beams where several pointy beams occupy a sector instead of random beams. As can be seen from the graph 1000, sectored random beams has the same performance as fully random beams. Also, as can be seen from the graph 1000, the use of sectored random beams requires fewer performance measurements to achieve the same performance as other beam training approach.

Figure 11:
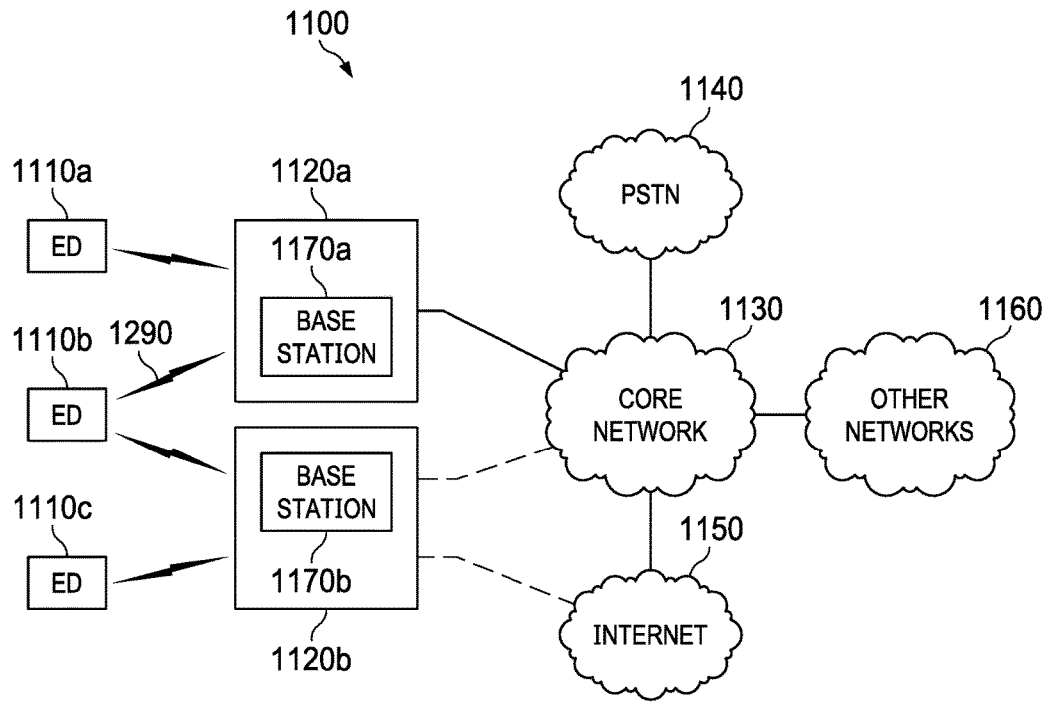
FIG. 11 illustrates an example communication system in which embodiments of the present disclosure could be implemented.

FIG. 11 illustrates an example communication system 1100 in which embodiments of the present disclosure could be implemented. In general, the communication system 1100 enables multiple wireless or wired elements to communicate data and other content. The purpose of the communication system 1100 may be to provide content (voice, data, video, text) via broadcast, narrowcast, user device to user device, etc. The communication system 1100 may operate by sharing resources such as bandwidth.

In this example, the communication system 1100 includes electronic devices (ED) 1100a-110c, radio access networks (RANs) 1110a-1120b, a core network 1130, a public switched telephone network (PSTN) 1140, the internet 1150, and other networks 1160. EDs are also referred to herein as UEs. Although certain numbers of these components or elements are shown in FIG. 11, any reasonable number of these components or elements may be included in the communication system 1100.

The EDs 1100a-1110c are configured to operate, communicate, or both, in the communication system 1100. For example, the EDs 1100a-1110c are configured to transmit, receive, or both via wireless or wired communication channels. Each ED 1100a-1110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 11, the RANs 1120a-1120b include base stations 1170a-1170b, respectively. Each base station 1170a-1170b is configured to wirelessly interface with one or more of the EDs 1110a-1110c to enable access to any other base station 1170a-1170b, the core network 1130, the PSTN 1140, the internet 1150, and/or the other networks 1160. For example, the base stations 1170a-1170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 1110a-1110c may be alternatively or additionally configured to interface, access, or communicate with any other base station 1170a-1170b, the internet 1150, the core network 1130, the PSTN 1140, the other networks 1160, or any combination of the preceding. The communication system 1100 may include RANs, such as RAN 1120b, wherein the corresponding base station 1170b accesses the core network 1130 via the internet 1150, as shown.

The EDs 1110a-1110c and base stations 1170a-1170b are examples of communication equipment that can be configured to implement some or all of the functionality and/or embodiments described herein. In the embodiment shown in FIG. 11, the base station 1170a forms part of the RAN 1120a, which may include other base stations, base station controller(s) (BSC), radio network controller(s) (RNC), relay nodes, elements, and/or devices. Any base station 1170a, 1170b may be a single element, as shown, or multiple elements, distributed in the corresponding RAN, or otherwise. Also, the base station 1170b forms part of the RAN 1120b, which may include other base stations, elements, and/or devices. Each base station 1170a-1170b transmits and/or receives wireless signals within a particular geographic region or area, sometimes referred to as a "cell" or "coverage area". A cell may be further divided into cell sectors, and a base station 1170a-1170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 1120a-1120b shown is exemplary only. Any number of RAN may be contemplated when devising the communication system 1100.

The base stations 1170a-1170b communicate with one or more of the EDs 1110a-1110c over one or more air interfaces 1190 using wireless communication links e.g. radio frequency (RF), microwave, infrared (IR), etc. The air interfaces 1190 may utilize any suitable radio access technology. For example, the communication system 1100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 1190.

A base station 1170a-1170b may implement Universal Mobile Telecommunication System (UMTS) Terrestrial Radio Access (UTRA) to establish an air interface 1190 using wideband CDMA (WCDMA). In doing so, the base station 1170a-1170b may implement protocols such as HSPA, HSPA+ optionally including HSDPA, HSUPA or both. Alternatively, a base station 1170a-1170b may establish an air interface 1190 with Evolved UTMS Terrestrial Radio Access (E-UTRA) using LTE, LTE-A, and/or LTE-B. It is contemplated that the communication system 1100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 1120a-1120b are in communication with the core network 1130 to provide the EDs 1110a-1110c with various services such as voice, data, and other services. The RANs 1120a-1120b and/or the core network 1130 may be in direct or indirect communication with one or more other RANs (not shown), which may or may not be directly served by core network 1130, and may or may not employ the same radio access technology as RAN 1120a, RAN 1120b or both. The core network 1130 may also serve as a gateway access between (i) the RANs 1120a-1120b or EDs 1110a-1110c or both, and (ii) other networks (such as the PSTN 1140, the internet 1150, and the other networks 1160). In addition, some or all of the EDs 1110a-1110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 1150. PSTN 1140 may include circuit switched telephone networks for providing plain old telephone service (POTS). Internet 1150 may include a network of computers and subnets (intranets) or both, and incorporate protocols, such as internet protocol (IP), transmission control protocol (TCP), user datagram protocol (UDP). EDs 1110a-1110c may be multimode devices capable of operation according to multiple radio access technologies, and incorporate multiple transceivers necessary to support such.

Figure 12A:
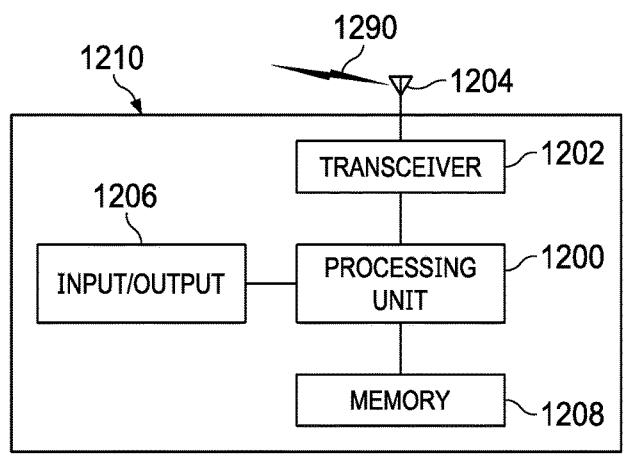
FIGS. 12A and 12B illustrate example devices that may implement the methods and teachings according to this disclosure.
Figure 12B:
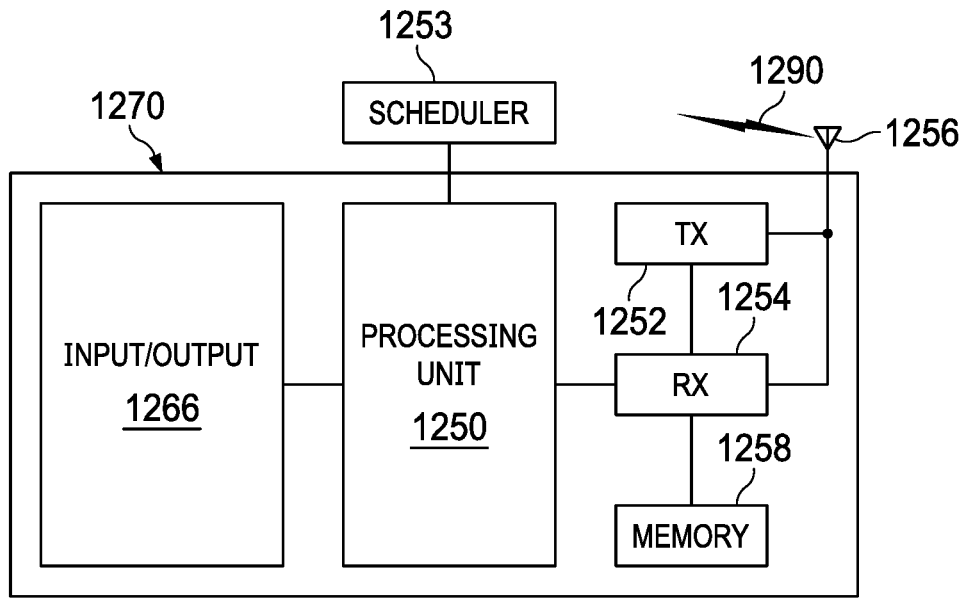

FIGS. 12A and 12B illustrate example devices that may implement the methods and teachings according to this disclosure. In particular, FIG. 12A illustrates an example ED 1210, and FIG. 12B illustrates an example base station 1270. These components could be used in the communication system 1200 or in any other suitable system.

As shown in FIG. 12A, the ED 1210 includes at least one processing unit 1200. The processing unit 1200 implements various processing operations of the ED 1210. For example, the processing unit 1200 could perform signal coding, data processing, power control, input/output processing, or any other functionality enabling the ED 1210 to operate in the communication system 1200. The processing unit 1200 may also be configured to implement some or all of the functionality and/or embodiments described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1210 also includes at least one transceiver 1202. The transceiver 1202 is configured to modulate data or other content for transmission by at least one antenna or Network Interface Controller (NIC) 1204. The transceiver 1202 is also configured to demodulate data or other content received by the at least one antenna 1204. Each transceiver 1202 includes any suitable structure for generating signals for wireless or wired transmission and/or processing signals received wirelessly or by wire. Each antenna 1204 includes any suitable structure for transmitting and/or receiving wireless or wired signals. One or multiple transceivers 1202 could be used in the ED 1210. One or multiple antennas 1204 could be used in the ED 1210. Although shown as a single functional unit, a transceiver 1202 could also be implemented using at least one transmitter and at least one separate receiver.

The ED 1210 further includes one or more input/output devices 1206 or interfaces (such as a wired interface to the internet 1250). The input/output devices 1206 permit interaction with a user or other devices in the network. Each input/output device 1206 includes any suitable structure for providing information to or receiving information from a user, such as a speaker, microphone, keypad, keyboard, display, or touch screen, including network interface communications.

In addition, the ED 1210 includes at least one memory 1208. The memory 1208 stores instructions and data used, generated, or collected by the ED 1210. For example, the memory 1208 could store software instructions or modules configured to implement some or all of the functionality and/or embodiments described above and that are executed by the processing unit(s) 1200. Each memory 1208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 1270 includes at least one processing unit 1250, at least one transmitter 1252, at least one receiver 1254, one or more antennas 1256, at least one memory 1258, and one or more input/output devices or interfaces 1266. A transceiver, not shown, may be used instead of the transmitter 1252 and receiver 1254. A scheduler 1253 may be coupled to the processing unit 1250. The scheduler 1253 may be included within or operated separately from the base station 1270. The processing unit 1250 implements various processing operations of the base station 1270, such as signal coding, data processing, power control, input/output processing, or any other functionality. The processing unit 1250 can also be configured to implement some or all of the functionality and/or embodiments described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transmitter 1252 includes any suitable structure for generating signals for wireless or wired transmission to one or more EDs or other devices. Each receiver 1254 includes any suitable structure for processing signals received wirelessly or by wire from one or more EDs or other devices. Although shown as separate components, at least one transmitter 1252 and at least one receiver 1254 could be combined into a transceiver. Each antenna 1256 includes any suitable structure for transmitting and/or receiving wireless or wired signals. Although a common antenna 1256 is shown here as being coupled to both the transmitter 1252 and the receiver 1254, one or more antennas 1256 could be coupled to the transmitter(s) 1252, and one or more separate antennas 1256 could be coupled to the receiver(s) 1254. Each memory 1258 includes any suitable volatile and/or non-volatile storage and retrieval device(s) such as those described above in connection to the ED 1210. The memory 1258 stores instructions and data used, generated, or collected by the base station 1270. For example, the memory 1258 could store software instructions or modules configured to implement some or all of the functionality and/or embodiments described above and that are executed by the processing unit(s) 1250.

Each input/output device 1266 permits interaction with a user or other devices in the network. Each input/output device 1266 includes any suitable structure for providing information to or receiving/providing information from a user, including network interface communications.

Figure 13:
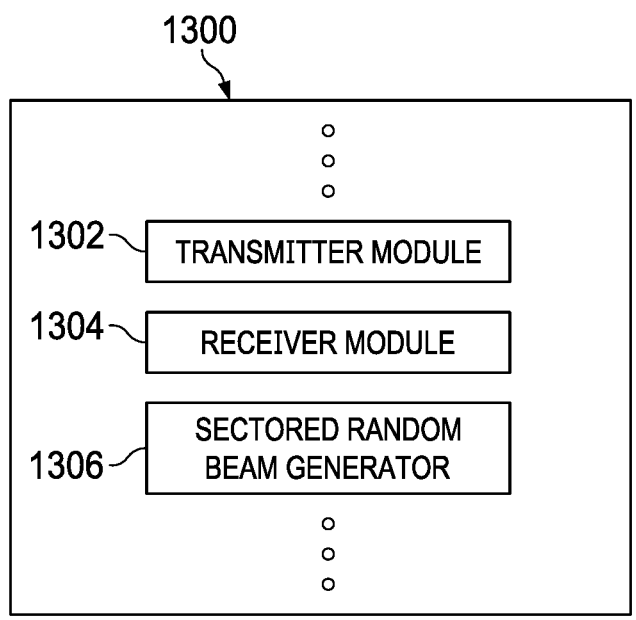
FIG. 13 is a block diagram of an embodiment of a base station for using sectored random beams for channel estimation and compressive channel estimation in massive MIMO.

FIG. 13 is a block diagram of an embodiment of a base station 1300 for using sectored random beams for channel estimation and compressive channel estimation in massive MIMO. It should be appreciated that one or more steps of the embodiment methods provided herein may be performed by corresponding units or modules, according to FIG. 13. For example, a signal may be transmitted by a transmitting unit or a transmitting module 1302. A signal may be received by a receiving unit or a receiving module 1304. A signal may be processed by a processing unit or a processing module. A sectored random beam may be generated by a sectored random beam generator unit or a sectored random beam generator module 1306. Other steps may be performed by other units or modules. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs and the base stations are known to those of skill in the art. As such, these details are omitted here for clarity.

In an embodiment, a method in a massive multiple input, multiple output (MIMO) transceiver for channel estimation includes obtaining a sector. The sector includes less than a complete coverage area of the transceiver. The method also includes transmitting, by the transceiver, a plurality of random beams to a user equipment (UE) in the sector.

In an embodiment, a transceiver in a massive multiple input, multiple output (MIMO) system configured for channel estimation includes a processor configured to obtain a sector. The sector includes less than a complete coverage area of the transceiver. The transceiver also includes a transmitter configured to transmit a plurality of random beams to a user equipment (UE) in the sector.

In an embodiment, a network component includes a memory storage. The memory storage includes instructions. The network component also includes one or more processors in communication with the memory. The one or more processors execute the instructions to obtain a sector, the sector comprising less than a complete coverage area of the transceiver. The one or more processor also execute the instructions to transmit a plurality of random beams to a user equipment (UE) in the sector.

In an embodiment, a method in a user equipment (UE) in a massive multiple input, multiple output (MIMO) environment for channel estimation includes receiving, by the UE, a training signal from a base station. The training signal includes a random sectored beam. The training signal also includes beam formers and a training sequence. The method also includes a preprocessing matrix and a measurement matrix, where the measurement from the training signal. The method also includes estimating a sparsified downlink channel according to the preprocessing matrix and the measurement matrix.

In an embodiment, a user equipment (UE) includes a memory storage comprising instructions and one or more processors in communication with the memory. The one or more processors execute the instructions to receive a training signal from a base station. The training signal includes a random sectored beam. The training signal also includes beam formers and a training sequence. The one or more processors also execute the instructions to obtain a preprocessing matrix and a measurement matrix. The measurement matrix is derived from the training signal. The one or more processors also execute the instructions to estimate a sparsified downlink channel according to the preprocessing matrix and the measurement matrix.

In one or more of the preceding aspects, the random beams are generated by spatial filtering of a random beam pattern.

In one or more of the preceding aspects, the random beams are generated according to spatial filter coefficients.

In one or more of the preceding aspects, a first one of the random beams is used on a first pilot subcarrier and a second one of the random beams is used on a second pilot subcarrier, wherein the first pilot subcarrier is different from the second pilot subcarrier.

In one or more of the preceding aspects, the random beams are aggregated together in one orthogonal frequency-division multiplexing (OFDM) symbol.

In one or more of the preceding aspects, the random beams occupy only a portion of the spatial spectrum.

In one or more of the preceding aspects, the sectors are formed based on frequency division duplex (FDD) reciprocity.

In one or more of the preceding aspects, the sectors are determined according to an uplink sounding signal from the UE.

In one or more of the preceding aspects, the sectors are determined according to out-of-band information.

In one or more of the preceding aspects, the preprocessing matrix is computed from a singular-value decomposition (SVD) of $X^*[k]A_E$, where X is the training signal, $A_E$ is a dictionary, and k is a subcarrier index.

In one or more of the preceding aspects, estimating the sparsified downlink channel comprises solving $\min\|d[k]\|_1$ subject to $\|P[k]y[k]-P[k]X^*[k]A_E d[k]\|_2^2 < \epsilon_P$, where P is the preprocessing matrix, $P[k]X^*[k]A_E$ is a combined matrix, and d is the estimated sparse channel.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a massive multiple input, multiple output (MIMO) transceiver for channel estimation, the method comprising:
    obtaining a sector of sectors, the sector comprising less than a complete coverage area of the transceiver; and
    transmitting, by the transceiver, a plurality of random beams to a user equipment (UE) in the sector, wherein the plurality of random beams are generated by spatial filtering of a random beam pattern.

2. The method of claim 1, wherein the random beams are generated according to spatial filter coefficients.

3. The method of claim 1, wherein a first one of the random beams is used on a first pilot subcarrier and a second one of the random beams is used on a second pilot subcarrier, wherein the first pilot subcarrier is different from the second pilot subcarrier.

4. The method of claim 1, wherein the random beams are aggregated together in one orthogonal frequency-division multiplexing (OFDM) symbol.

5. The method of claim 1, wherein the random beams occupy only a portion of the spatial spectrum.

6. The method of claim 1, wherein the sectors are formed based on frequency division duplex (FDD) reciprocity.

7. The method of claim 1, wherein the sectors are determined according to an uplink sounding signal from the UE.

8. The method of claim 1, wherein the sectors are determined according to out-of-band information.

9. A transceiver in a massive multiple input, multiple output (MIMO) system configured for channel estimation comprising:
    a processor configured to obtain a sector of sectors, the sector comprising less than a complete coverage area of the transceiver; and
    a transmitter configured to:
        transmit a plurality of random beams to a user equipment (UE) in the sector, wherein the plurality of random beams are generated by spatial filtering of a random beam pattern.

10. The transceiver of claim 9, wherein the random beams are generated according to spatial filter coefficients.

11. The transceiver of claim 9, wherein a first one of the random beams is used on a first pilot subcarrier and a second one of the random beams is used on a second pilot subcarrier, wherein the first pilot subcarrier is different from the second pilot subcarrier.

12. The transceiver of claim 9, wherein the random beams are aggregated together in one orthogonal frequency-division multiplexing (OFDM) symbol.

13. The transceiver of claim 12, wherein the random beams occupy only a portion of the spatial spectrum.

14. The transceiver of claim 9, wherein the sectors are formed based on frequency division duplex (FDD) reciprocity.

15. The transceiver of claim 9, wherein the sectors are determined according to an uplink sounding signal from the UE.

16. The transceiver of claim 9, wherein the sectors are determined according to out-of-band information.

17. A network component comprising:
    a memory storage comprising instructions; and
    one or more processors in communication with the memory storage, wherein the one or more processors execute the instructions to:
        obtain a sector of sectors, the sector comprising less than a complete coverage area of a transceiver; and
        transmit a plurality of random beams to a user equipment (UE) in the sector, wherein the plurality of random beams are generated by spatial filtering of a random beam pattern.

* * * * *